US012456901B2

(12) United States Patent
Mammeri et al.

(10) Patent No.: US 12,456,901 B2
(45) Date of Patent: Oct. 28, 2025

(54) COOLING MODULE FOR AN ELECTRIC MOTOR VEHICLE, COMPRISING A TANGENTIAL-FLOW TURBOMACHINE

(71) Applicant: VALEO SYSTEMES THERMIQUES, La Verriere (FR)

(72) Inventors: Amrid Mammeri, La Verriere (FR); Erwan Etienne, La Verriere (FR); Gael Durbecq, La Verriere (FR); Kamel Azzouz, La Verriere (FR)

(73) Assignee: VALEO SYSTEMES THERMIQUES, La Verriere (FR)

( * ) Notice: Subject to any disclaimer, the term of this patent is extended or adjusted under 35 U.S.C. 154(b) by 299 days.

(21) Appl. No.: 18/043,390

(22) PCT Filed: Aug. 31, 2021

(86) PCT No.: PCT/EP2021/074034
§ 371 (c)(1),
(2) Date: Feb. 28, 2023

(87) PCT Pub. No.: WO2022/043586
PCT Pub. Date: Mar. 3, 2022

(65) Prior Publication Data
US 2023/0327512 A1 Oct. 12, 2023

(30) Foreign Application Priority Data
Aug. 31, 2020 (FR) ...................................... 2008837

(51) Int. Cl.
*H02K 5/20* (2006.01)
*B60K 11/08* (2006.01)
(Continued)

(52) U.S. Cl.
CPC .............. *H02K 5/207* (2021.01); *B60K 11/08* (2013.01); *F01P 5/04* (2013.01); *F04D 17/08* (2013.01);
(Continued)

(58) Field of Classification Search
CPC ......... H02K 5/207; H02K 9/02; B60K 11/08; F01P 3/18; F01P 5/04; F01P 2003/187
See application file for complete search history.

(56) References Cited

U.S. PATENT DOCUMENTS

| 4,866,320 A | 9/1989 | Schulz |
| 5,060,720 A | 10/1991 | Wollaber et al. |
| 2005/0029027 A1 | 2/2005 | Kunikata et al. |

FOREIGN PATENT DOCUMENTS

| EP | 0304638 A1 | 3/1989 |
| EP | 1715157 A1 | 10/2006 |
| GB | 2117721 A | 10/1983 |

OTHER PUBLICATIONS

European Patent Office, International Search Report (w/English translation) and Written Opinion of corresponding International Application No. PCT/EP2021/074034, dated Oct. 12, 2021.

*Primary Examiner* — Sean Kayes
(74) *Attorney, Agent, or Firm* — Osha Bergman Watanabe & Burton LLP

(57) ABSTRACT

The invention relates to a cooling module for a motor vehicle, including at least one heat exchanger, at least one tangential turbomachine, a housing having a first suction opening and an exhaust opening between which flows a first air stream passing through the at least one heat exchanger and at least one electric motor for controlling the rotation of the at least one tangential-flow turbomachine, the electric motor being arranged on the outer wall of the housing, the electric motor including at least one air inlet and one air outlet. The housing includes a second suction opening, the (Continued)

air outlet of the motor being in fluid connection with the second suction opening so as to allow a second air stream to flow.

11 Claims, 15 Drawing Sheets

(51) Int. Cl.
*F01P 5/04* (2006.01)
*F04D 17/08* (2006.01)
*F04D 25/06* (2006.01)
*H02K 9/06* (2006.01)

(52) U.S. Cl.
CPC ............... *F04D 25/06* (2013.01); *H02K 9/06* (2013.01); *F01P 2005/046* (2013.01)

COOLING MODULE FOR AN ELECTRIC MOTOR VEHICLE, COMPRISING A TANGENTIAL-FLOW TURBOMACHINE

TECHNICAL FIELD

The invention relates to a cooling module for an electric motor vehicle, comprising a tangential-flow turbomachine. The invention also relates to an electric motor vehicle provided with such a cooling module.

BACKGROUND OF THE INVENTION

A cooling module (or heat exchange module) of a motor vehicle conventionally comprises at least one heat exchanger and a ventilation device suitable for generating an air stream passing through the at least one heat exchanger. The ventilation device thus makes it possible, for example, to generate an air stream passing through the heat exchanger when the vehicle is stationary. This ventilation device takes the form, for example, of a tangential-flow turbomachine driven by a motor positioned outside the cooling module. Depending on its workload, the electric motor must also be cooled.

However, due to its mounting position, the cooling thereof is sub-optimal and there can be a risk of overheating.

SUMMARY OF THE INVENTION

One aim of the invention is to propose a cooling module for an electric motor vehicle without at least some of the above-mentioned drawbacks.

To this end, the invention relates to a cooling module for a motor vehicle with an electric motor, the cooling module comprising at least one heat exchanger, at least one tangential-flow turbomachine capable of creating a first air stream passing through the at least one heat exchanger, a housing configured to accommodate the at least one heat exchanger and said at least one tangential-flow turbomachine, the housing comprising a first intake opening and a discharge opening between which the first air stream flows, at least one electric motor for controlling the rotation of said at least one tangential-flow turbomachine, the electric motor being positioned on the outer wall of the housing, said electric motor comprising at least one air inlet and one air outlet, the cooling module being characterized in that the housing comprises a second intake opening, the air outlet of the at least one motor being fluidly connected to said second intake opening so as to allow the flow of a second air stream passing in succession through the air inlet of the motor, the air outlet of the motor and the second intake opening of the housing to join the first air stream inside the housing.

Such a cooling module makes it possible to increase the cooling performance of the motor of the tangential-flow turbomachine while preventing excessive consumption by said electric motor. The fluid connection between the second intake opening of the housing and the air inlet of the cover makes it possible to guide a second air stream through the electric motor of the turbomachine with a sufficient fresh air flow rate.

In addition, this arrangement can result in greater freedom in terms of architecture of the heat exchange module, and for example makes it possible to reduce the footprint of the heat exchange module while making it lighter.

Advantageously, the tangential-flow turbomachine makes it possible to create an air stream through all of the heat exchangers with significantly better efficiency than if an axial-flow turbomachine was used.

The invention can further comprise one or more of the following aspects taken alone or in combination:
- the housing comprises a casing forming a chamber into which both the second intake opening and the air outlet of the electric motor emerge;
- the casing comprises an opening into which the electric motor is inserted so that the air inlet of the electric motor is outside the chamber;
- the electric motor comprises a cover having a circular cup shape comprising a bottom wall and a peripheral rim;
- the air outlet of said electric motor is formed by at least one orifice arranged in the bottom wall of said cover;
- a plurality of orifices are distributed about the axis of revolution of the cup-shaped cover of the electric motor;
- the orifices of the cover are distributed with even angular spacing about the axis of revolution of the cover of the electric motor;
- the motor comprises a power supply unit;
- the cover is positioned so that it faces said power supply unit, and a gap is formed between said power supply unit and the peripheral rim of the cover so as to form the air inlet of said cover;
- the air outlet of the motor is positioned facing the second intake opening of the housing;
- the second intake opening of the housing is situated on a lateral face of the cooling module;
- the lateral face extends perpendicular to the axis of the turbine of the tangential-flow turbomachine;
- the second intake opening of the housing is positioned level with the axis of the turbine of the tangential-flow turbomachine;
- the second intake opening of the housing is positioned upstream of the at least one heat exchanger;
- the second intake opening of the housing is positioned between the tangential-flow turbomachine and the at least one heat exchanger;
- the cooling module comprises a plurality of heat exchangers, in particular aligned along a stacking axis;
- the second intake opening of the housing is positioned between two heat exchangers of the plurality of heat exchangers;
- the cooling module comprises an air delivery duct positioned on an outer face of the housing;
- the delivery duct comprises a recess covering the at least one electric motor;
- the delivery duct comprises a channel connecting the air inlet of the electric motor to an offset intake zone of the housing of the cooling module;
- the cooling module comprises at least two tangential-flow turbomachines positioned parallel to each other;
- each tangential-flow turbomachine comprises a dedicated electric motor;
- the housing comprises an individual second intake opening associated with each electric motor.

BRIEF DESCRIPTION OF DRAWINGS

Further advantages and features of the invention will become more clearly apparent from reading the following description, given by way of illustrative and non-limiting example, and the appended drawings, in which.

DETAILED DESCRIPTION OF THE INVENTION

In the figures, identical elements have the same reference numbers.

The longitudinal, transverse and vertical directions indicated in some of the figures are designated by the dihedron (X, Y, Z).

The following embodiments are examples. Although the description refers to one or more embodiments, this does not necessarily mean that each reference relates to the same embodiment, or that the features apply only to a single embodiment. Individual features of various embodiments can also be combined or interchanged to provide other embodiments.

In the description, ordinal numbering can be applied to certain elements, such as first element or second element. In this case, the ordinal number is simply to differentiate and denote elements that are similar but not identical. This ordinal numbering does not imply that one element takes priority over another and such numbering can easily be interchanged without departing from the scope of the present description. Likewise, this ordinal numbering does not imply any chronological order.

Figure 1:
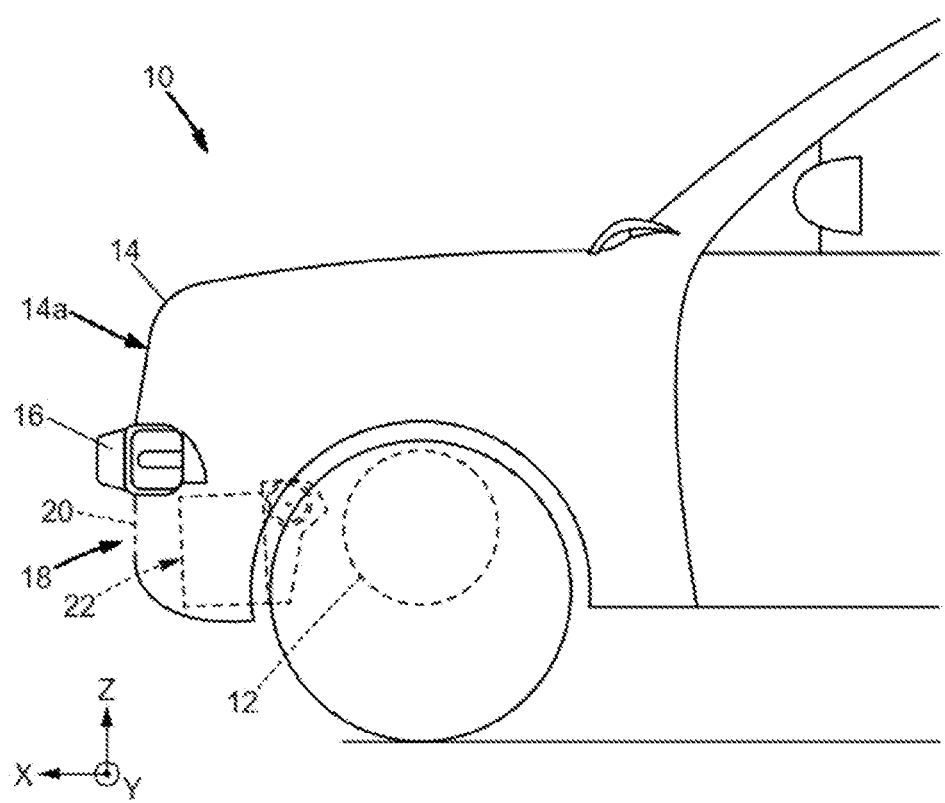
FIG. 1 schematically shows the front part of a motor vehicle with an electric motor, seen from the side.

FIG. 1 schematically shows the front part of a motor vehicle 10 with an electric motor 12. The vehicle 10 has in particular a body 14 and a fender 16 that are supported by a chassis (not shown) of the motor vehicle 10. The body 14 defines a cooling opening 18, that is, an opening through the body 14. In this case, there is only one cooling opening 18. This cooling opening 18 is situated in the lower part of the front end 14a of the body 14. In the example illustrated, the cooling opening 18 is situated below the fender 16. A grille 20 can be positioned in the cooling opening 18 to prevent projectiles from being able to pass through the cooling opening 18. A cooling module 22 is positioned facing the cooling opening 18. The grille 20 makes it possible in particular to protect this cooling module 22.

Figure 2:
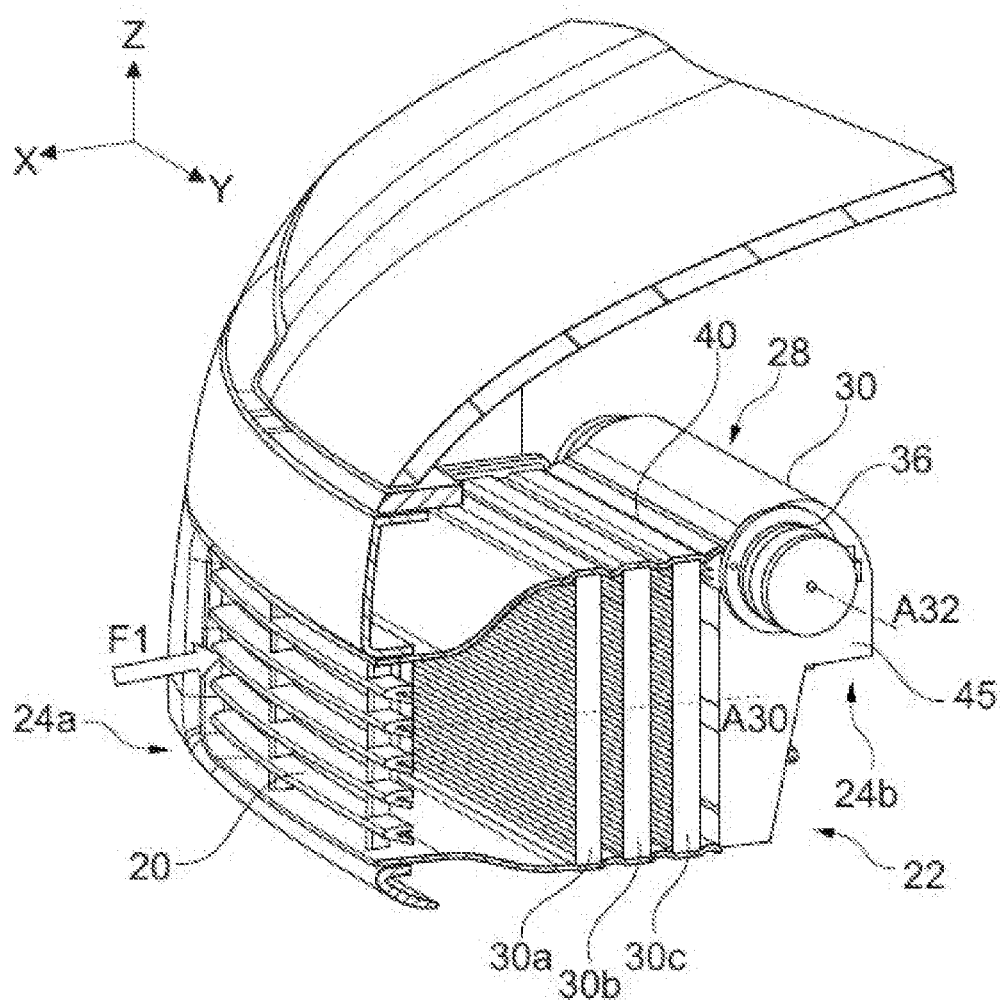
FIG. 2 shows a partially cross-sectional perspective view of a front end of a motor vehicle comprising an example of an embodiment of a cooling module.

The cooling module 22 is more clearly visible in FIG. 2. As illustrated in FIG. 2, the cooling module 22 essentially comprises a housing 24 forming an internal channel between two opposite ends 24a, 24b. More specifically, the housing 24 comprises a first intake opening 24a and a discharge opening 24b between which flows the first air stream F1 generated by at least one turbomachine 28 of the cooling module 22. In addition, the cross-section of the duct formed in the housing 24 is significantly greater at the end 24a than at its opposite end 24b.

The housing 24 makes it possible to accommodate at least one heat exchanger 30a-30c and the at least one tangential-flow turbomachine 28, which is capable of creating a first air stream F1 passing through the at least one heat exchanger 30a-30c.

According to the embodiment of the cooling module 22 illustrated in FIG. 2, it comprises a plurality of heat exchangers 30a-30c that are in particular aligned along a stacking axis A30. The stacking axis A30 is in particular perpendicular to the axis A32 of the turbine 32 of the tangential-flow turbomachine 28. The heat exchangers 30a-30c are positioned one behind the other in the internal channel formed by the housing 24. In this example, the cooling module 22 comprises three heat exchangers 30a, 30b and 30c. It is of course entirely possible to envisage a cooling module 22 comprising only two heat exchangers 30a, 30b or even more than three heat exchangers 30a-30c. The heat exchanger furthest downstream in the direction of flow of the first air stream F1, in this case the heat exchanger 30c, has a warmer fluid passing through it and is positioned further from the end 24a of the housing 24 intended to be positioned just behind the cooling opening 18 than the furthest upstream heat exchanger, in this case the heat exchanger 30a, which has a cooler fluid passing through it. The positioning of the heat exchangers 30a-30c one behind the other in the axial direction X of the cooling module 22 also makes it possible to limit the footprint of the cooling module 22 in its two other lateral and vertical dimensions.

The tangential-flow turbomachine 28 comprises a turbine 32 that can also be described as a tangential blower-wheel. The turbine 32 has a substantially cylindrical shape and has an axis of rotation A32. Advantageously, this axis of rotation A32 is oriented substantially parallel to the lateral direction Y of the at least one heat exchanger 30a-30c, as illustrated more particularly in FIG. 2.

The cooling module 22 also comprises at least one electric motor 36 for controlling the rotation of said at least one tangential-flow turbomachine 28. The motor 36 is for example suitable for rotating the turbine 32 at a speed of between 200 rpm and 14,000 rpm. This makes it possible in particular to limit the noise generated by the turbomachine 28. The motor 36 (or geared motor) is capable of rotating the turbine 32 about its rotational axis A32. The electric motor 36 is positioned on the outer wall of the housing 24.

Figure 3:
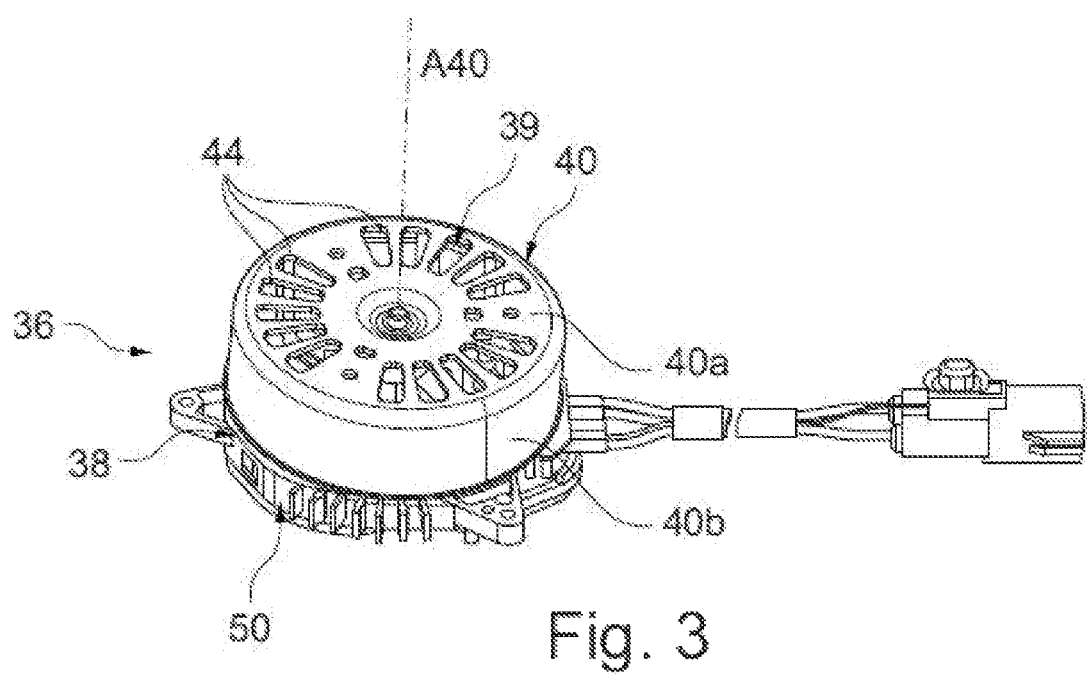
FIG. 3 shows a perspective view of the electric motor of the turbomachine of the cooling module in FIG. 2.

As illustrated in FIG. 3, the motor 36 more particularly comprises at least one air inlet 38 and at least one air outlet 39. The air outlet 39 can more particularly be positioned on a cover 40 of the motor 36, said cover 40 more particularly covering the stator and the windings (not shown) of the motor 36.

According to one embodiment of the cover 40, it has a circular cup shape comprising a bottom wall 40a and a peripheral rim 40b. The air outlet 39 of said electric motor 36 is for example formed by at least one orifice 44 arranged in the bottom wall 40a of said cover 40. The cup shape makes it possible to facilitate the installation of the cover 40 on the electric motor 36, and also makes it possible to cover the maximum surface area of the electric motor 36, in particular the stator and windings thereof.

The cup-shaped cover 40 comprises in particular a plurality of orifices 44 distributed about the axis of revolution A40 of the cover 40 of the electric motor 36, as illustrated in particular in FIG. 3. The plurality of orifices 44 makes it possible to increase the flow area of the air outlet 39 of the electric motor 36 while ensuring stability of the cover 40, in particular if it is cup-shaped.

More specifically, the orifices 44 of the cover 40 are distributed with even angular spacing about the axis of revolution A40 of the cover 40 of the electric motor 36. This embodiment makes it possible to facilitate the forming of the cover 40 during manufacturing. According to one variant, the spacing between two neighboring orifices 44 is not the same for all of the orifices 44 of the cover 40, as illustrated for example in FIG. 3.

In addition, the motor 36 comprises in particular a power supply unit 50 for said electric motor 36, as illustrated in FIG. 3. The cover 40 is generally positioned so that it faces said power supply unit 50. The air inlet 39 of the electric motor 36 is more particularly formed by a gap (denoted by a double arrow e1 in FIG. 4) formed between said power supply unit 50 and the peripheral rim of the cover 40. This gap e1 makes it possible in particular for a second air stream F2 to flow between the air inlet 38 and the air outlet 39 of the motor 36. This second air stream F2 is denoted by a thick black arrow in FIG. 4.

The path taken by the second air stream F2 passes in particular through the air inlet 38 at the gap e1, the second air stream F2 thus flowing in the plane formed by the Y and Z axes initially, and then the second air stream F2 passes through the motor 36 and through the orifices 44 of the cover 40, parallel to the Y axis.

The second air stream F2 more particularly denotes an air mass set in motion by the negative pressure generated by the turbomachine 28. More particularly, starting the turbomachine 28 generates a pressure difference between the first intake opening 24a and the inlet of the turbomachine 28. In other words, the pressure at the inlet of the turbomachine 28 is lower than outside the cooling module 22, which makes it possible to move an air mass forming the second air stream F2 through the housing 24.

Figure 4:
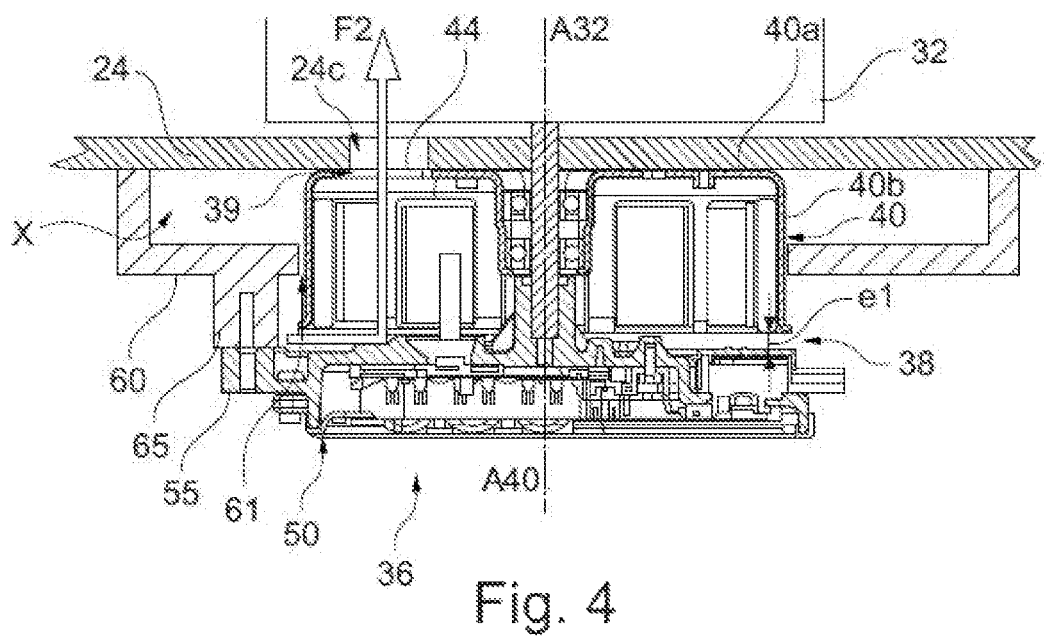
FIG. 4 shows a cross-sectional view of the electric motor in FIG. 3.

Again as illustrated by FIG. 4, the housing 24 of the cooling module 22 comprises a second intake opening 24c in order to allow the second air stream F2 to pass into the cooling module 22. The second intake opening 24c of the housing 24 is situated for example on a lateral face of the cooling module 22, the lateral face extending perpendicular to the axis A32 of the tangential-flow turbomachine 28. The cooling module 22 more particularly comprises two lateral faces positioned on either side of the housing 24, these lateral faces being parallel to the plane generated by the X and Z axes.

The air outlet 39 of the electric motor 36 is fluidly connected to the second intake opening 24c so as to allow the flow of the second air stream F2 intended to cool the motor 36 by flowing through the second intake opening 24c, then through the inlet 38 and through the motor 36 before being expelled by the air outlet 39 of the electric motor 36 to join the first air stream F1 inside the housing 24.

As illustrated in FIG. 4, the housing 24 can comprise a casing 60 forming a chamber X into which both the second intake opening 24c and the air outlet 39 of the electric motor 36 emerge so that they are fluidly connected. The casing 60 comprises an opening 61 into which the electric motor 36, and more particularly its cover 40, is inserted so that the air inlet 38 of the electric motor 36 is outside the chamber X. The electric motor 36 can in particular be fastened to this casing 60 by means of fastening lugs 55 facing fastening elements 65 of the casing 60. The electric motor 36 can thus be fastened to the casing 60 by means of screws, clips or rivets. Other means of fastening the casing 60 to the power supply unit 50 can be envisaged.

The level of negative pressure and the temperature of the air taken in through the second intake opening 24c affect the coolness of the second air stream F2; a high level of negative pressure increases the coolness of the second air stream F2. The temperature of the second air stream F2 depends largely on the location in which the air is taken in to form this second air stream F2. More particularly, three intake zones 81, 82 and 83 can be distinguished near the cooling module 22 to supply the air intended to pass through the inlet 38 of the cover 40 to cool the motor 36. These intake zones 81, 82, 83 are for example all at atmospheric pressure, but they differ from each other in that they have different air temperatures and are positioned separately on the cooling module 22.

Figure 5:
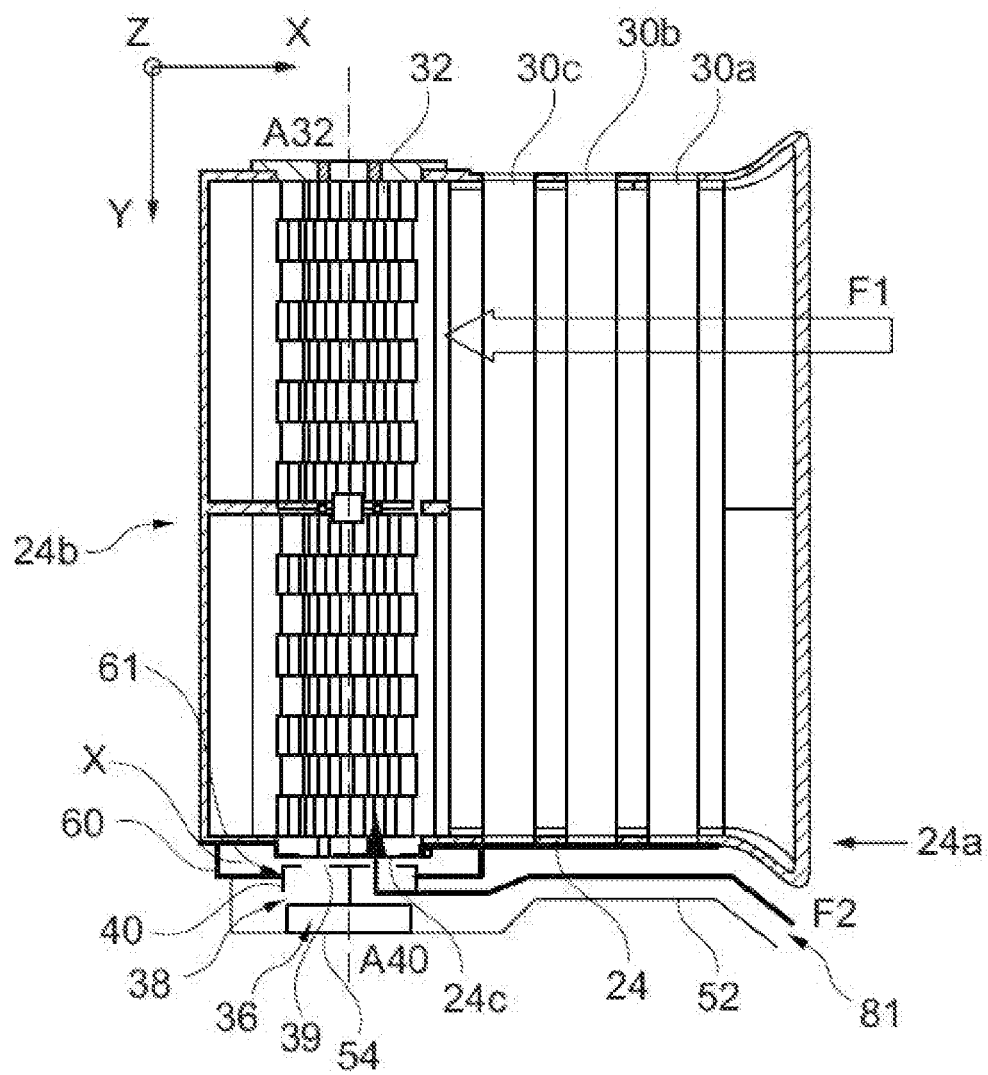
FIG. 5 shows a top view of a first embodiment of the cooling module in FIG. 2.
Figure 6:
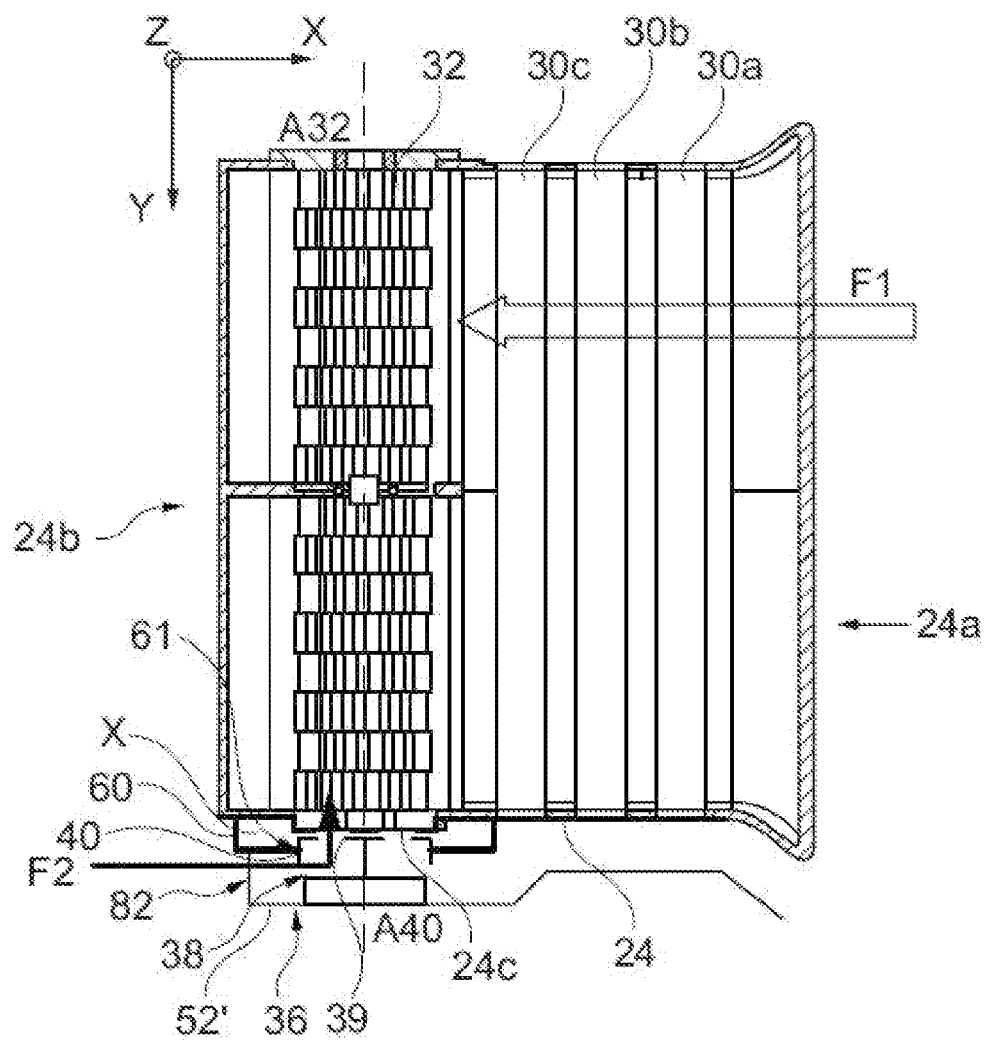
FIG. 6 shows a top view of a second embodiment of the cooling module in FIG. 2.

As illustrated in FIGS. 5 and 6, the intake zones 81 and 82 can be offset relative to the positioning of the turbine 32. The cooling module 22 thus comprises a delivery duct 52, 52'. This duct 52, 52' comprises a recess covering the at least one electric motor 36 and a channel connecting the air inlet 38 of the electric motor 36 and these offset intake zones 81, 82.

As illustrated in FIG. 5, a first offset intake zone 81 can be situated level with the first intake opening 24a. This first intake zone 81 can be defined by a relatively cool temperature corresponding in particular to ambient temperature, that is, in a range extending from 10° C. to 30° C. Intake from this zone 81 makes it possible to increase the efficiency of the cooling of the motor 36.

The cooling module 22 then comprises an air delivery duct 52 positioned on an outer face of the housing 24. The delivery duct 52 comprises in particular a recess 54 covering the at least one electric motor 36 and a channel connecting the upstream end of the housing 24 of the cooling module 22 level with its first intake opening 24a to the second intake opening 24c of said housing 24. The delivery duct 52 more particularly makes it possible to draw fresh air from the zone 81 to the inlet of the cooling module 22 in order to allow improved cooling of the motor 36.

As illustrated in FIG. 6, an offset second intake zone 82 can for example be situated level with the second end 24b. This second intake zone 82 can be defined by a relatively high temperature, for example of the order of 55° C., or even greater than or equal to 60° C. This second zone 82 is closest to the turbomachine 28, which makes it possible to shorten the path of the air taken in to the inlet 38 of the motor 36, but it is also the zone in which the temperature of the air taken in is hottest, which can reduce the cooling effect of the second air stream F2 on the motor 36.

The cooling module 22 then comprises an air delivery duct 52' positioned on an outer face of the housing 24, and this air delivery duct 52' more particularly makes it possible to draw fresh air from the zone 82. The air delivery duct 52' comprises a channel connecting the downstream end of the housing 24 of the cooling module 22 to the second intake opening 24c of said housing 24.

Figure 7:
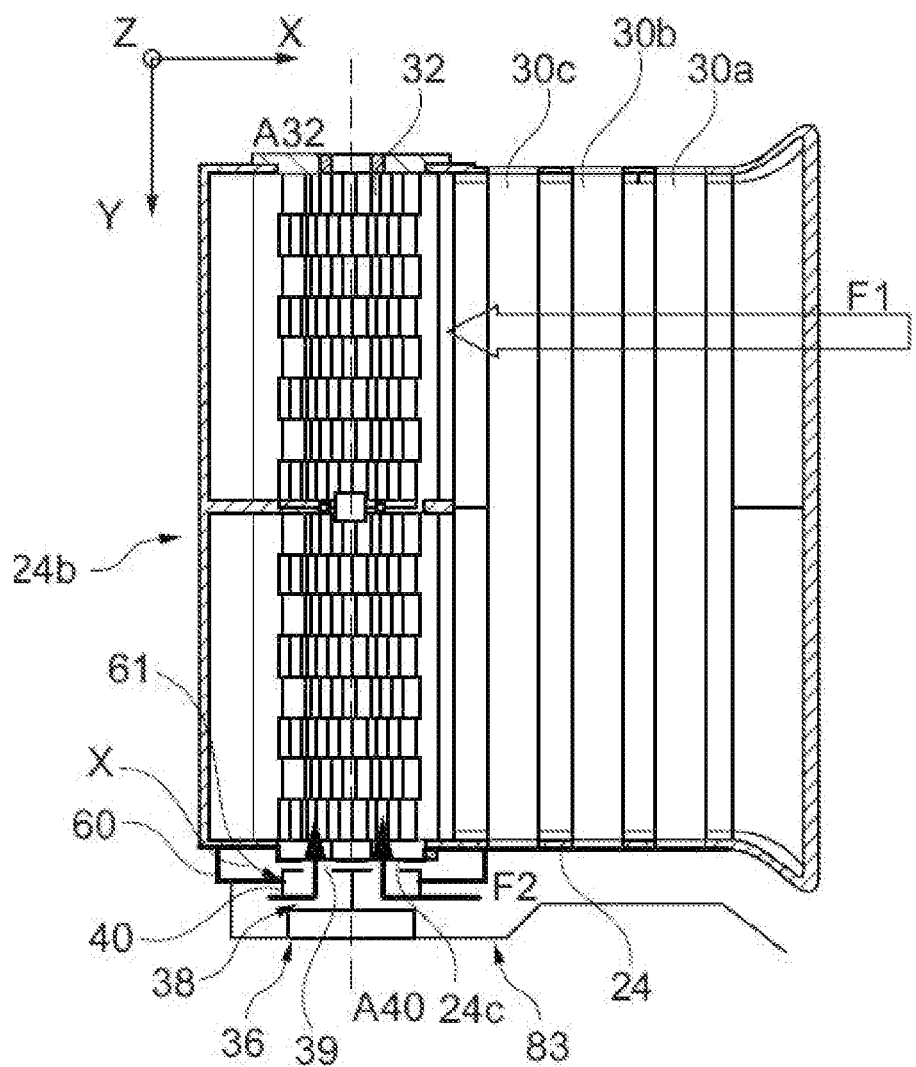
FIG. 7 shows a top view of a third embodiment of the cooling module in FIG. 2.

As illustrated in FIG. 7, a third zone 83 can be situated in a zone adjacent to a lateral face of the cooling module 22, more specifically level with the turbine 32. The temperature of the air taken in from this third zone 83 is in particular between the respective temperatures given as examples for the zones 81 and 82. Positioning the inlet 38 of the cover 40 in this third zone 83 can have the advantage of reducing the footprint of the cooling module 22. One embodiment of the cooling module exploiting the advantage of an air intake from this third zone 83 is illustrated in particular in FIG. 7.

The temperature gradient observed between the three zones 81, 82, and 83 is due to the heating of the first air stream F1 passing through the at least one heat exchanger 30*a*-30*c*.

Numerous positions of the second intake opening 24*c* of the housing 24 can also be envisaged within the cooling module 22 to ensure the fluid connection between the air outlet 39 of the motor 36 and the second intake opening 24*c*. The air outlet 39 of the motor 36 is for example positioned facing the second intake opening 24*c* of the housing 24 as illustrated in FIGS. 4 to 7. This configuration is highly advantageous, as it makes it possible to shorten the fluid connection between the air outlet 39 of the motor 36 and the second intake opening 24*c* of the housing 24.

In addition, according to a variant of this configuration (not shown), it is entirely possible to envisage dispensing with the presence of a casing 60 and a chamber X in order to achieve the fluid connection between the air outlet 39 of the electric motor 36 and the second intake opening 24*c*. In this case, the fluid connection would be directly between them.

Figure 8:
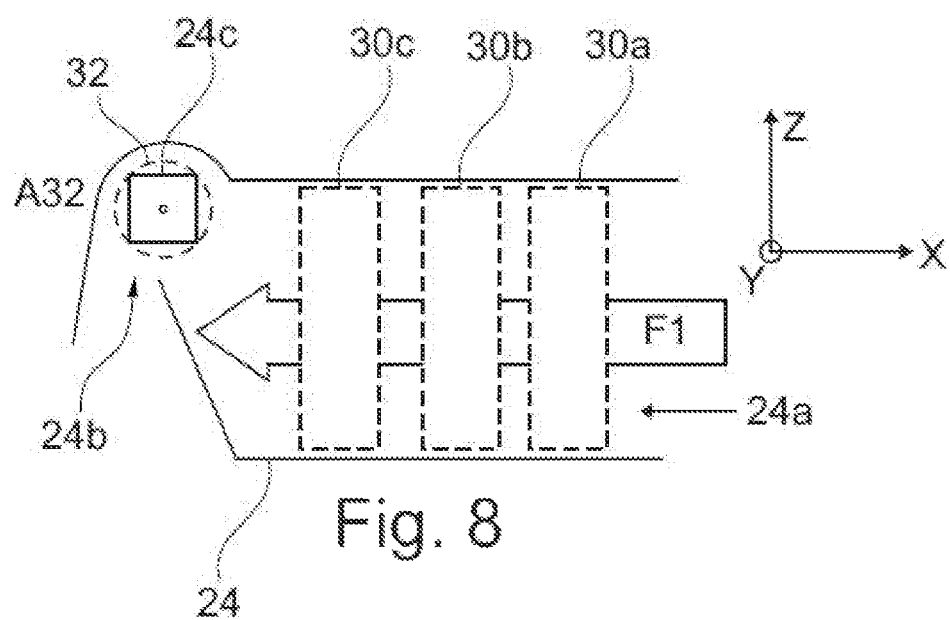
FIG. 8 shows a side view of the cooling module in FIG. 2.

According to an embodiment shown diagrammatically in FIGS. 4 to 7 and more particularly visible in FIG. 8, the second intake opening 24*c* of the housing 24 is for example positioned level with the axis A32 of the turbine 32 of the tangential-flow turbomachine 28. In this embodiment, the axis A32 of the turbine 32 and the axis of revolution A40 of the cover 40 of the motor 36 can be coincident, and this specific feature is illustrated in particular in FIGS. 4, 5, 6, and 7. Such an arrangement makes it possible to avoid contact between the second air stream F2 and the at least one heat exchanger 30*a*-30*c*.

Figure 9:
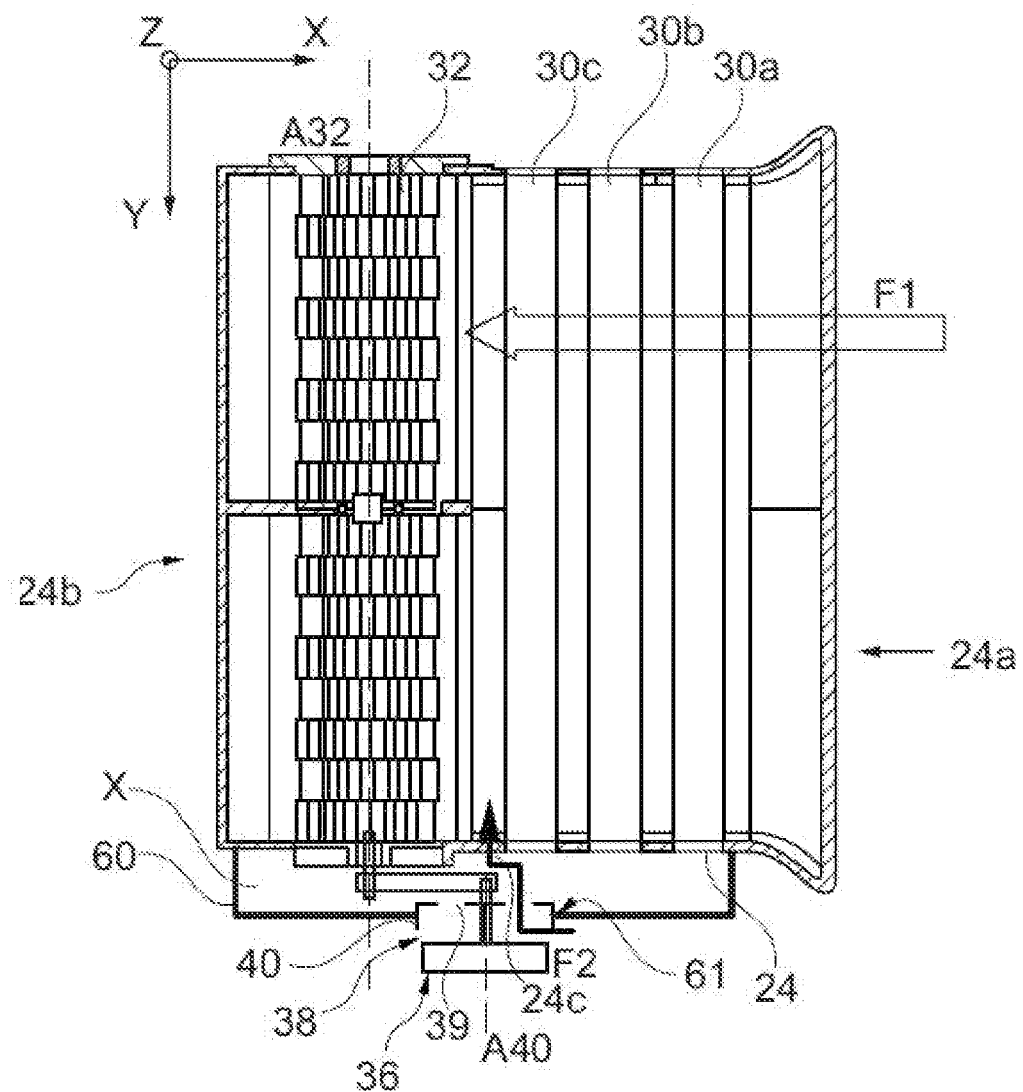
FIG. 9 shows a top view of a first variant of the cooling module in FIG. 2.
Figure 10:
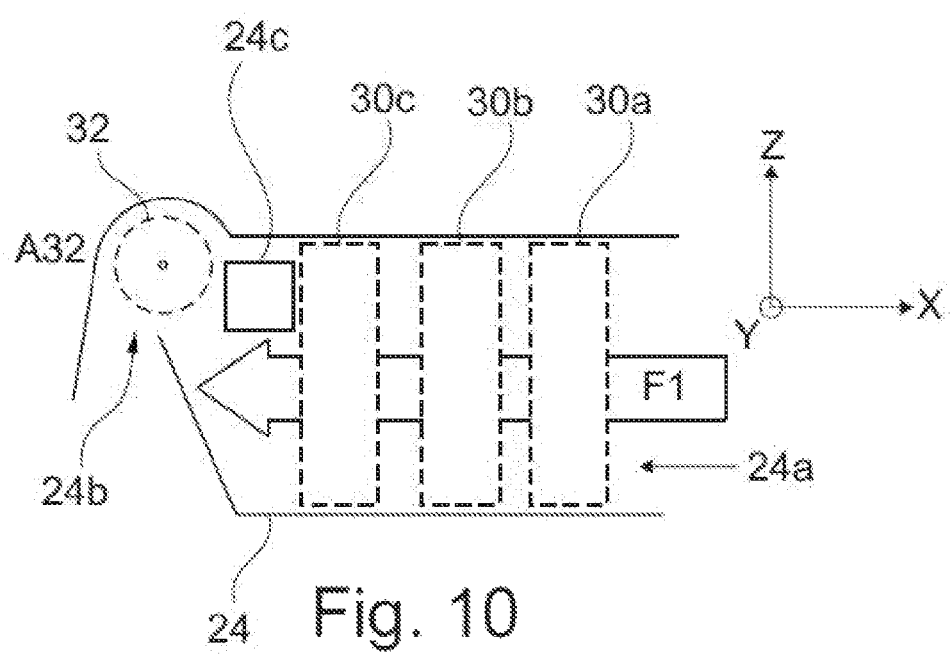
FIG. 10 shows a side view of the cooling module in FIG. 9.

According to another embodiment shown diagrammatically in FIGS. 9 and 10, the second intake opening 24*c* of the housing 24 is positioned between the tangential-flow turbomachine 28 and the at least one heat exchanger 30*a*-30*c*. In this particular configuration, the second air stream F2 expelled by the air outlet 39 of the cover 40 joins the first air stream F1 at the outlet of the at least one heat exchanger 30*a*-30*c* before following a tangential trajectory level with the turbine 32 of the tangential-flow turbomachine 28. The motor is offset so that the axes A40 and A36 are not coincident, as shown in FIG. 9.

Figure 11:
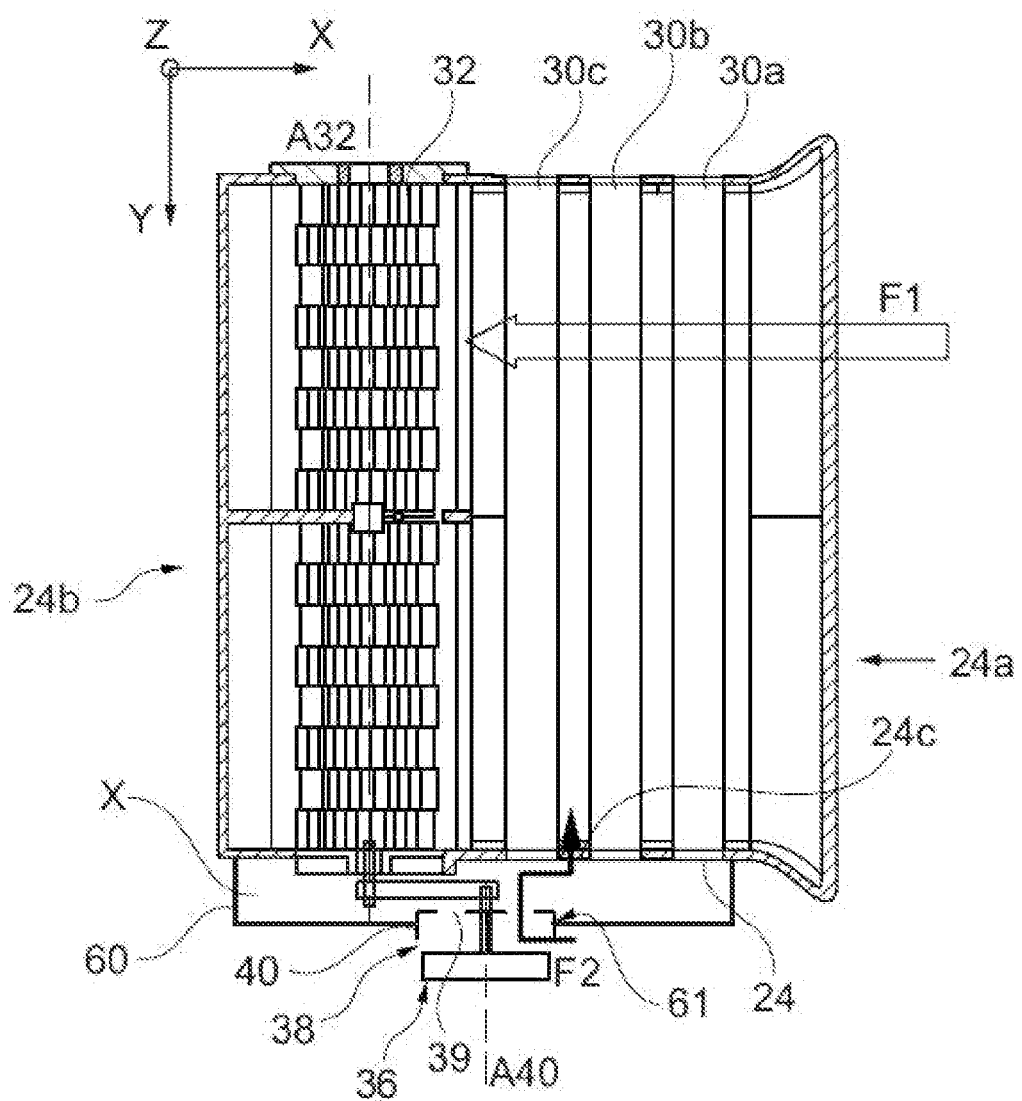
FIG. 11 shows a top view of a second variant of the cooling module in FIG. 2.
Figure 12:
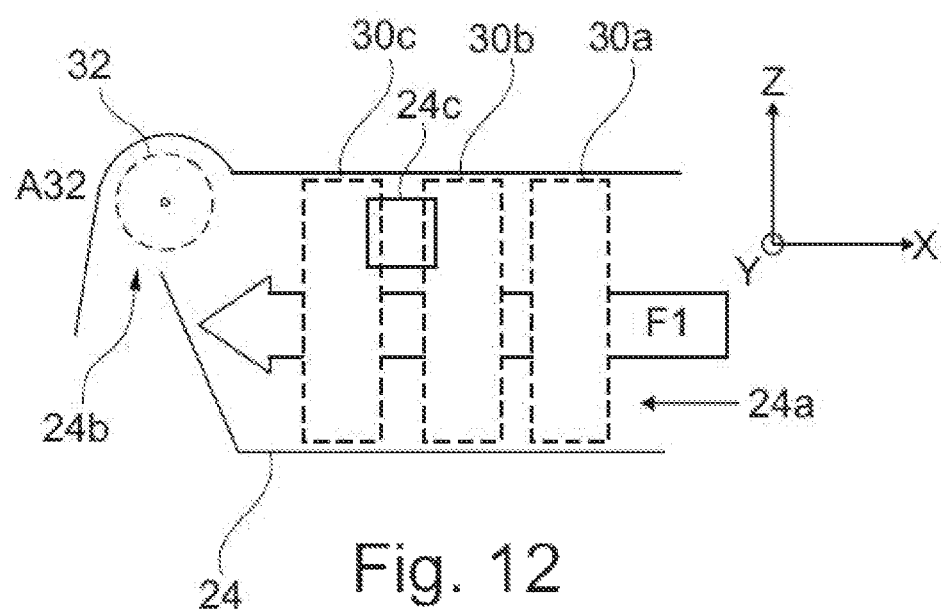
FIG. 12 shows a side view of the cooling module in FIG. 11.
Figure 13:
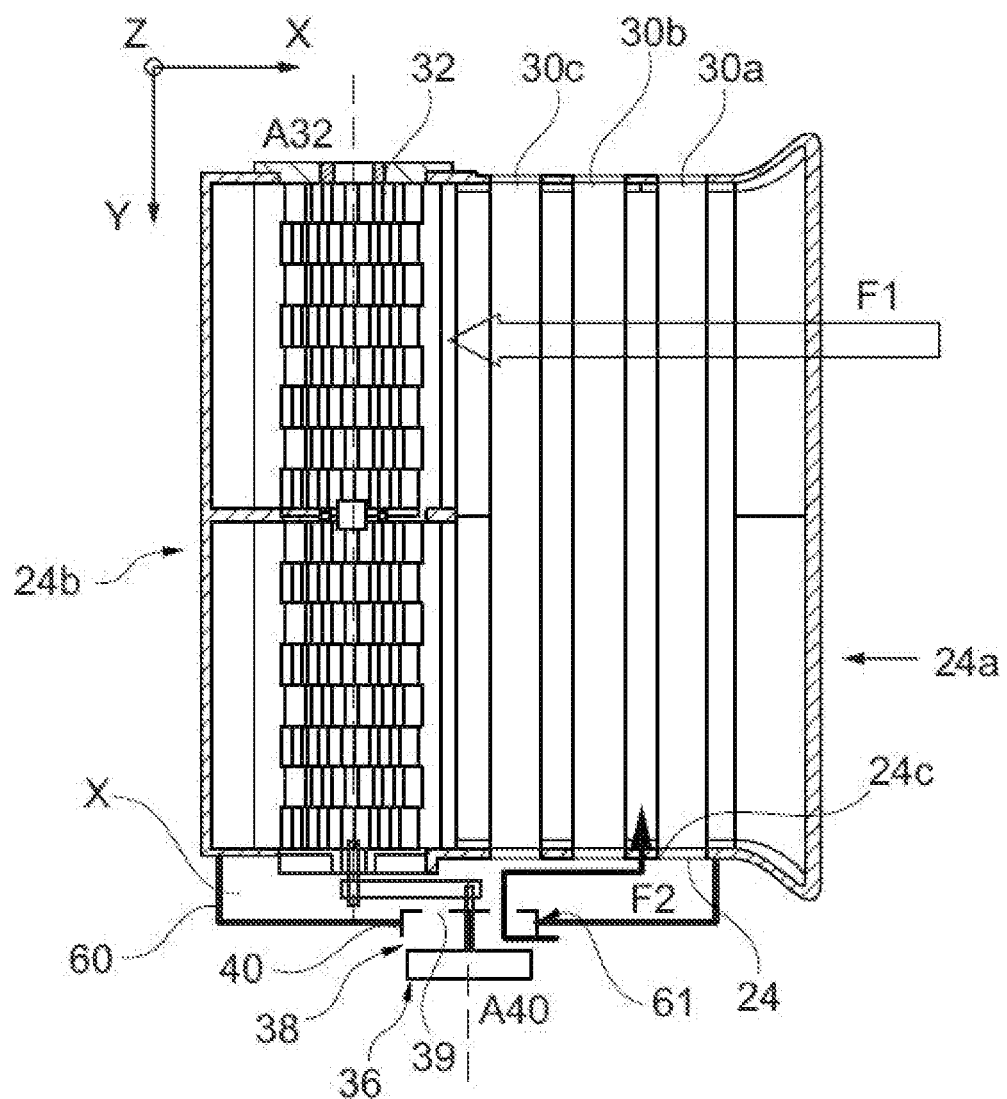
FIG. 13 shows a top view of a third variant of the cooling module in FIG. 2.
Figure 14:
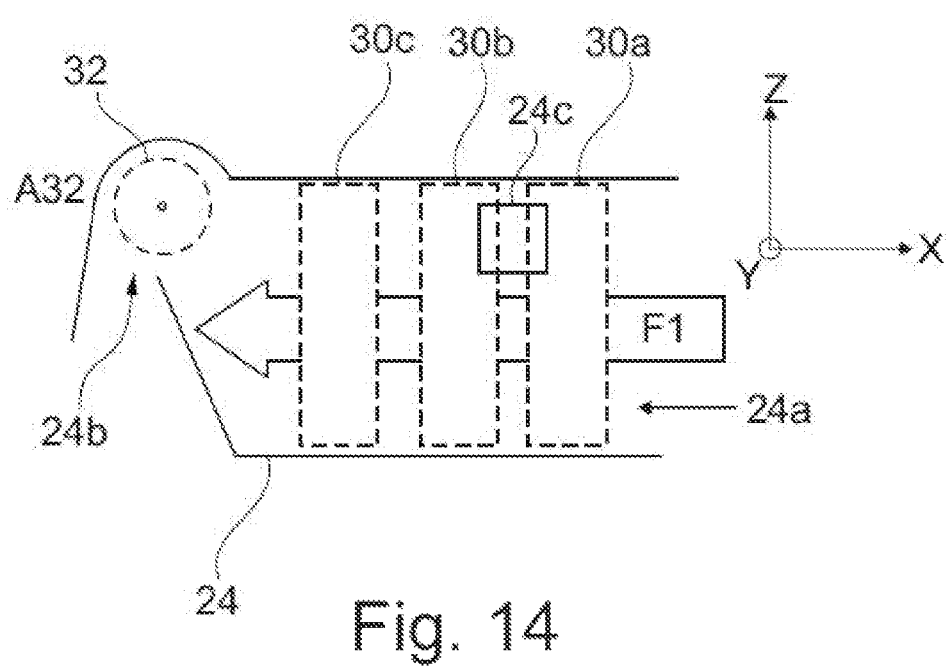
FIG. 14 shows a side view of the cooling module in FIGS. 13.

According to another embodiment, the second intake opening 24*c* of the housing 24 is for example positioned between two heat exchangers of the plurality of heat exchangers 30*a*-30*c*. This configuration is shown diagrammatically in FIGS. 11, 12, 13, and 14. More particularly, the second intake opening 24*c* of the housing 24 is positioned between the heat exchangers 30*b* and 30*c* in FIGS. 11 and 12, while in FIGS. 13 and 14, the second intake opening 24*c* of the housing 24 is positioned between the heat exchangers 30*a* and 30*b*. In these examples, the motor 36 is offset so that the axes A40 and A36 are not coincident, as shown in FIGS. 11 and 13.

Figure 15:
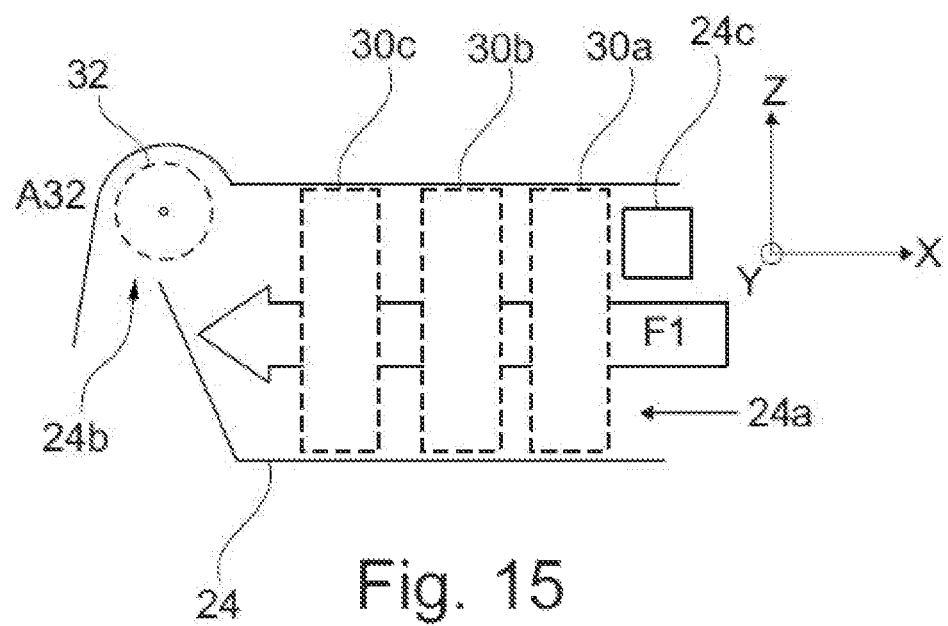
FIG. 15 shows a side view of a fourth variant of the cooling module in FIG. 2.

According to another embodiment illustrated in FIG. 15, the second intake opening 24*c* of the housing 24 is positioned upstream of the at least one heat exchanger 30*a*-30*c*. In this particular configuration, the second air stream F2 expelled by the air outlet 39 of the cover 40 joins the first air stream F1 before it passes through the at least one heat exchanger 30*a*-30*c*.

The most advantageous configuration combines the positioning of the air outlet 39 of the cover 40 facing the second intake opening 24*c* with an air intake from the zone 81. This particular configuration is shown in FIG. 5.

Theoretically, the simplest configuration to set up combines the positioning of the air outlet 39 of the cover 40 facing the second intake opening 24*c* with an air intake from the zone 83, as in this particular embodiment, the housing 24 does not require the presence of an air delivery duct 52, 52'. This particular configuration is shown in FIG. 7.

According to another embodiment of the cooling module 22 (not shown), it comprises at least two tangential-flow turbomachines 28 positioned parallel to each other. In this particular embodiment, each tangential-flow turbomachine 28 in particular comprises a dedicated electric motor 36, and the housing 24 comprises an individual second intake opening associated with each electric motor. Each second intake opening thus allows the flow of an individual air stream, these air streams being intended to each cool an electric motor 36 associated therewith.

The invention is not limited to the exemplary embodiments described with reference to the figures, and further embodiments will be clearly apparent to a person skilled in the art. In particular, the various examples can be combined, provided they are not contradictory.

What is claimed is:

1. A cooling module for a motor vehicle, comprising:
   at least one heat exchanger;
   at least one tangential-flow turbomachine configured to create a first air stream passing through the at least one heat exchanger;
   a housing configured to accommodate the at least one heat exchanger and said at least one tangential-flow turbomachine, the housing including a first intake opening and a discharge opening between which the first air stream flows; and
   at least one electric motor for controlling the rotation of said at least one tangential-flow turbomachine, the at least one electric motor being positioned on an outer wall of the housing, said at least one electric motor including at least one air inlet and one air outlet,
   wherein the housing includes a second intake opening, the air outlet of the at least one electric motor being fluidly connected to said second intake opening so as to allow the flow of a second air stream passing in succession through the at least one air inlet of the at least one electric motor, the air outlet of the at least one electric motor and the second intake opening of the housing to join the first air stream inside the housing, and
   wherein the second intake opening of the housing is positioned upstream of the at least one heat exchanger.

2. The cooling module as claimed in claim 1, wherein the housing includes a casing forming a chamber into which both the second intake opening and the air outlet of the at least one electric motor emerge, the casing including an opening into which the at least one electric motor is inserted so that the air outlet of the at least one electric motor is outside the chamber.

3. The cooling module as claimed in claim 1, wherein the at least one electric motor includes a cover having a circular cup shape including a bottom wall and a peripheral rim, the air outlet of said at least one electric motor being formed by at least one orifice arranged in the bottom wall of said cover.

4. The cooling module as claimed in claim 3, wherein a plurality of orifices are distributed about the axis of revolution of the cup-shaped cover of the at least one electric motor.

5. The cooling module as claimed in claim 1, wherein the air outlet of the at least one electric motor is positioned facing the second intake opening of the housing.

6. The cooling module as claimed in claim 1, wherein the second intake opening of the housing is situated on a lateral face of the cooling module, the lateral face extending perpendicular to the axis of the turbine of the at least one tangential-flow turbomachine.

7. The cooling module as claimed in claim 1, wherein the second intake opening of the housing is positioned level with the axis of the turbine of the at least one tangential-flow turbomachine.

8. The cooling module as claimed in claim 1, further comprising a plurality of heat exchangers, wherein the second intake opening of the housing is positioned between two heat exchangers of the plurality of heat exchangers.

9. The cooling module as claimed in claim 1, further comprising an air delivery duct positioned on an outer face of the housing, said air delivery duct including a recess covering the at least one electric motor and a channel connecting the at least one air inlet of the electric motor to an offset intake zone of the housing of the cooling module.

10. The cooling module as claimed in claim 1, further comprising a plurality of heat exchangers aligned along a stacking axis, wherein the second intake opening of the housing is positioned between two heat exchangers of the plurality of heat exchangers.

11. A cooling module for a motor vehicle, comprising:
at least one heat exchanger;
at least one tangential-flow turbomachine configured to create a first air stream passing through the at least one heat exchanger;
a housing configured to accommodate the at least one heat exchanger and said at least one tangential-flow turbomachine, the housing including a first intake opening and a discharge opening between which the first air stream flows;
at least one electric motor for controlling the rotation of said at least one tangential-flow turbomachine, the at least one electric motor being positioned on an outer wall of the housing, said at least one electric motor including at least one air inlet and one air outlet; and
an air delivery duct positioned on an outer face of the housing, said air delivery duct including a recess covering the at least one electric motor and a channel connecting the at least one air inlet of the electric motor to an offset intake zone of the housing of the cooling module,
wherein the housing includes a second intake opening, the air outlet of the at least one electric motor being fluidly connected to said second intake opening so as to allow the flow of a second air stream passing in succession through the at least one air inlet of the at least one electric motor, the air outlet of the at least one electric motor and the second intake opening of the housing to join the first air stream inside the housing.

* * * * *